United States Patent
Seinen (10) Patent No.: US 11,232,215 B2
(45) Date of Patent: Jan. 25, 2022

(54) ELECTRONIC LABORATORY NOTEBOOK SYSTEM AND METHOD

(71) Applicant: Bio-ITech BV, Groningen (NL)

(72) Inventor: Erwin Seinen, Groningen (NL)

(*) Notice: Subject to any disclaimer, the term of this patent is extended or adjusted under 35 U.S.C. 154(b) by 164 days.

(21) Appl. No.: 16/300,465

(22) PCT Filed: May 8, 2017

(86) PCT No.: PCT/EP2017/060930
§ 371 (c)(1),
(2) Date: Nov. 9, 2018

(87) PCT Pub. No.: WO2017/194473
PCT Pub. Date: Nov. 16, 2017

(65) Prior Publication Data
US 2019/0095632 A1 Mar. 28, 2019

(30) Foreign Application Priority Data
May 9, 2016 (EP) .................................... 16001050

(51) Int. Cl.
*H04L 29/06* (2006.01)
*H04L 29/08* (2006.01)
(Continued)

(52) U.S. Cl.
CPC ............ *G06F 21/602* (2013.01); *G06F 16/10* (2019.01); *G06F 16/152* (2019.01);
(Continued)

(58) Field of Classification Search
CPC ........ G06F 21/602; G06F 16/93; G06F 16/10; G06F 16/953; G06F 16/252;
(Continued)

(56) References Cited

U.S. PATENT DOCUMENTS 7,310,629 B1 * 12/2007 Mendelson ............. H04L 63/08
8,352,731 B2 * 1/2013 Zhou ..................... H04L 63/101
713/156

(Continued)

OTHER PUBLICATIONS

Adapting the electronic laboratory notebook for the semantic era, Talbott et al, Dec. 2005 (Year: 2005).*

*Primary Examiner* — Jahangir Kabir
(74) *Attorney, Agent, or Firm* — Todd Lorenz (57) ABSTRACT

Electronic laboratory notebook (ELN) system (1), comprises an ELN managing application (3) of an ELN service provider and being accessible for clients via the Internet and being configured for managing the access of the clients on the electronic laboratory notebook represented by ELN data in an ELN database hosted by the ELN service provider, a client computer (2) being located on premises of the client and connected to the internet (4), the client computer (2) running a client software (7) to communicate with the ELN managing application (3) via the Internet (4), a local storage server (5) being located on premises of the client, the local storage server being configured for storing ELN-files, which include content of the ELN, and the ELN application (3) being configured for controlling, in dependence on the client's access rights, the transfer of the ELN-files between the local storage server and the client computer.

13 Claims, 2 Drawing Sheets

On premises of client | Internet | ELN service provider

1: ELN system    2: client computer    3: ELN managing application    4: Internet
5: local storage server    6: ELN host server    7: client software    8: ELN database 11: receiving a signal from the client software 7 at the ELN managing application 3 indicating that at least one data object is to be entered into the ELN system 1
12: let the ELN host server 6 generate a unique identifier (ID) and a public key, and send this back to the client software 7
13: present at the client computer 2 an upload dialog for selecting at least one file, containing the at least one data object
14: let the client software 7 send the at least one file to the local storage server 5, along with the ID and the public key
15: let the local storage server 5 store the at least one file and associate the ID with the at least one file
16: let the local storage server 5 generate a hash value in dependence on the at least one file
17: let the local storage server 5 encrypt a message containing the hash value along with other meta data, using the public key
18: let the encrypted hash value be transferred from the local storage server 5 back to the client software 7
19: let the client software 7 forward the encrypted message containing at least the hash value and the metadata to the ELN managing application 3
20: let the ELN managing application 3 decrypt the message containing at least the encrypted hash value and the metadata, using a private key
21: let the ELN managing application, and/or in particular the ELN host server, store the metadata extracted from the decrypted message that includes at least the hash value and the metadata, along with the ID, in the ELN database (51) Int. Cl.
    *H04L 9/30*     (2006.01)
    *H04L 9/32*     (2006.01)
    *G06F 21/60*     (2013.01)
    *G06F 16/14*     (2019.01)
    *G06F 16/25*     (2019.01)
    *G06F 21/62*     (2013.01)
    *G06F 21/64*     (2013.01)
    *G06F 16/93*     (2019.01)
    *G06F 16/10*     (2019.01)
    *G06F 16/953*     (2019.01)

(52) U.S. Cl.
    CPC ............ *G06F 16/252* (2019.01); *G06F 16/93* (2019.01); *G06F 16/953* (2019.01); *G06F 21/6218* (2013.01); *G06F 21/64* (2013.01); *H04L 9/30* (2013.01); *H04L 9/3242* (2013.01); *H04L 67/06* (2013.01); *H04L 67/1097* (2013.01); *H04L 67/42* (2013.01)

(58) Field of Classification Search
    CPC .... G06F 16/152; G06F 21/6218; G06F 21/64; H04L 9/30; H04L 9/3242; H04L 67/06; H04L 67/1097; H04L 67/42
    USPC .................................................. 713/165–167
    See application file for complete search history.

(56) References Cited

U.S. PATENT DOCUMENTS

| | | | |
|---|---|---|---|
| 8,352,999 B1* | 1/2013 | Zhan | H04L 63/104 726/1 |
| 9,842,151 B2* | 12/2017 | Wang | H04L 63/0428 |
| 2007/0208800 A1* | 9/2007 | Frohlich | G06Q 10/10 709/203 |
| 2009/0106552 A1* | 4/2009 | Mohamed | G06F 21/6227 713/165 |
| 2012/0204024 A1* | 8/2012 | Augenstein | G06F 21/602 713/150 |
| 2015/0169717 A1* | 6/2015 | Wang | G06F 16/27 707/618 |
| 2016/0098571 A1* | 4/2016 | Corrales | G06F 21/6209 713/165 |
| 2019/0095632 A1* | 3/2019 | Seinen | H04L 67/1097 |

* cited by examiner

Fig. 1

On premises of client | Internet | ELN service provider

1: ELN system   2: client computer   3: ELN managing application   4: Internet
5: local storage server   6: ELN host server   7: client software   8: ELN database 11: receiving a signal from the client software 7 at the ELN managing application 3 indicating that at least one data object is to be entered into the ELN system 1
12: let the ELN host server 6 generate a unique identifier (ID) and a public key, and send this back to the client software 7
13: present at the client computer 2 an upload dialog for selecting at least one file, containing the at least one data object
14: let the client software 7 send the at least one file to the local storage server 5, along with the ID and the public key
15: let the local storage server 5 store the at least one file and associate the ID with the at least one file
16: let the local storage server 5 generate a hash value in dependence on the at least one file
17: let the local storage server 5 encrypt a message containing the hash value along with other meta data, using the public key
18: let the encrypted hash value be transferred from the local storage server 5 back to the client software 7
19: let the client software 7 forward the encrypted message containing at least the hash value and the metadata to the ELN managing application 3
20: let the ELN managing application 3 decrypt the message containing at least the encrypted hash value and the metadata, using a private key
21: let the ELN managing application, and/or in particular the ELN host server, store the metadata extracted from the decrypted message that includes at least the hash value and the metadata, along with the ID, in the ELN database

Fig. 2

On premises of client | Internet | ELN service provider

1: ELN system   2: client computer   3: ELN managing application   4: Internet
5: local storage server   6: ELN host server   7: client software   8: ELN database 31: let the ELN managing application 3 receive a query of the client software 7 indicating that the client seeks to download at least one data object, which was previously entered into the ELN system 1, from the ELN system 1
32: let the ELN managing application 3 receive a query of the client software 7 requesting the location of the at least one data object, which was previously entered into the ELN system 1, in the ELN system
33: let the ELN managing application 3, as a response to said query, lookup the users role and permissions and decide to either decline the request
34: let the ELN managing application 3, as a reply to said query, extract the location from the ELN database, where the metadata and the ID were stored before, and send the location and the ID to the client software 7
35: let the client software 7 find the local storage server 5 using the location and forward the ID to the local storage server 5
36: let the local storage server 5 find the at least one data object using the ID and send the at least one data object directly to the client

ELECTRONIC LABORATORY NOTEBOOK SYSTEM AND METHOD

The invention relates to an Electronic laboratory notebook (ELN) system, and a method for managing ELN data in an ELN system.

Electronic laboratory notebooks are known to effectively replace paper lab books and provide extended features, which arise from the quickly advancing technologies related to information and data processing. ELNs provide the automated recording and easy access of research data. Tracing the provenance of data allows for later querying and historical analysis of data and their origins. Inputs, entities, systems and processes influencing the data may be registered to render the whole process transparent and provable. This kind of laboratory information management is used by research and industry companies for auditing and compliance analysis of research data, in particular in the pharmaceutical and biomedical field.

There are different concepts to implement an ELN system. In the past, ELNs were set up locally behind a corporate firewall using local hard- and software, maintained by local staff. Such a system may be referred to as on premises system or local system. An on premises installation often conflicts with a fast implementation and the option to collaborate easily with external partners. Cloud based systems are used now as alternatives, where the data are stored external to the customers local network on the remote data storage servers of an Internet based ELN service provider.

In typical cloud based solutions, an Internet server application is provided as a Software as a Service (SaaS) to the customers. The Internet server application represents the central instance for managing the ELN. The Internet server application controls the access on the data storage servers owned by the ELN service provider, wherein the data storage servers contain the ELN data of all customers. Such an Internet server application may be accessed by standard Internet browsers, which means that the customers save the effort for running their own hardware and software systems. The ELN service provider of such a cloud based solution also has the responsibility for guaranteeing security and the integrity of the data, which are stored on the data storage servers of the ELN service provider and which, generally, are encrypted. An example of such an approach is described by EP 1 647 873 A1.

Data security is a major concern to many biotech and pharmaceutical companies that are looking to implement a cloud-based electronic lab notebook. Data may have an immense value or be highly sensitive. For example, many labs within University Medical Centers (UMCs) need to work with data that can be related to patients. This poses a problem for using a cloud-based web application due to local IT policies, because this policies restrict the users from storing this type of data anywhere else than in the local systems. Traditionally this would mean that the supplier needs to build an on premises installation purely for the use of that single UMC, thereby losing the advantages of a cloud based solution.

It is the object of the present invention to solve the aforementioned problem.

The object is solved by the electronic laboratory notebook system of claim 1 and the method according to claim 8. Preferred embodiments of the invention are, in particular, the subject matter of the dependent claims.

With respect to the example of storing patient data for an UMC, the technology underlying the invention allows to confine patient data in ELN files that are stored on premises using the ELN system according to the invention. Using an embodiment of this approach, the integrity of files can still be monitored by the ELN managing application, so that the track&trace, i.e. the complete monitoring of the provenance of ELN data, which is required for many GxP and ISO certifications, remains intact. The content of the ELN files will never go beyond the on premises network and the ELN managing application is configured to check the integrity of the files, but preferably not configured to check the content. This way, any required local security policies can be met while the advantages of a cloud based ELN are largely preserved.

Another advantage of the ELN system and method according to the invention is that the costs and time of recording and accessing large files in an ELN data storage can be reduced. A typical problem of running prior art cloud-based ELN is that the volume of data files to be recorded can be very high. For Internet applications this can be difficult due to the fact that Internet networks are not optimized for handling large files which makes it a slow process. If the user wants to use the file after uploading, it needs to be downloaded again, which causes a relatively long wait time before the file is ready for use. If many users within the same network are requesting big network transfers simultaneously, it can cause congestion problems towards the Internet, which has a negative impact for all the users in that network while using the internet. In addition, the transfer itself is costly due to data transfer rates, but also the storage in data centers is much more expensive. The solution according to the invention offers the possibility of implementing an efficient connection between the local computer client and the local storage server, while largely keeping the advantages of a cloud based ELN.

ELN are used by scientists and technicians to document, store, retrieve, and share fully electronic laboratory records in ways that meet all legal, regulatory, technical and scientific requirements. The ELN may be used to be a legal document and may be used in a court of law as evidence. Similar to an inventor's notebook, the ELN may be referred to in patent prosecution and intellectual property litigation. The ELN has the advantages of being easy to search upon, support collaboration amongst many users, and being secure. Any item, or selected items, that the user of the present ELN system wants to be recorded by the ELN system, i.e. entered into the ELN system, e.g. notes, drawings, audio files, movies, and the like, represented by any file format, are referred to as data objects.

An electronic laboratory notebook (ELN), generally, is understood to be or comprise a software program or software package, preferably including a database, which contains or represents the content of the ELN. "A data entry representing the content" means that the data entry in the ELN database contains the reference to a file, which may be stored separately from the database, e.g. stored on the local storage server. According to the invention, the ELN database may not at all contain any data objects, or may only contain data objects selected by the user.

Preferably, the ELN is configured to include one or more of the following functions: importation of data which has already been captured elsewhere; direct recording of experiments or data objects in various forms like text, images, audio files, movies, and tables; lending of structure to data and information through the use of preformatted or customizable templates which include a range of field types; creation of links between records; storage of fully searchable records in a secure database format; inclusion of a messaging system for better collaboration; a secure yet flexible environment to protect the integrity of both data and process while allowing for process changes; integration of digital signing and witnessing with the creation and updating of records; means of digital signature using the user's standard password (e.g. for users within an Microsoft® Active Directory environment, their "Windows" password); integration of any log on security feature (e.g. password enabled, finger print enabled, voice activated, retina scan, etc.); inserting a digital signature into the records generated by the ELN, wherein digital signatures are embedded in a document and are not themselves data—unlike electronic signatures; integration of mathematical representations, e.g. a hash value, of the data object, e.g. the ELN file including, in particular, both the signature itself and the particulars of how the signature came to be inserted in the document, e.g. the date, system, the user, etc., wherein embedding the electronic signature ensures that the signature is unaltered; generation of secure forms that accept laboratory data input via a computing device and/or laboratory equipment; accommodation for networked or wireless communications; a scheduling option for routine procedures such as equipment qualification and study-related timelines; configurable qualification requirements.

According to an exemplary configuration of the ELN, the data objects to be recorded by the ELN system may include content and/or metadata. At least one data object may be referred to as experiment data, may have any predetermined format and may include a collection of data objects. Examples of metadata which may aid in subsequent characterization and retrieval of specific experiments include: the title, subject, description, source, language, relation, coverage, name of user, date, type, format and identifier.

Preferably, the ELN database is selected from at least one of the following types: a relational database, a key/value database, and a modified relational database. Further, in some embodiments the data entries in the database are related hierarchically. The ELN database contains and/or represents data objects and, possibly, metadata relating thereto. A data entry may be a reference to a file location, e.g. the path or address of an ELN-file. In case that a client wants at least one data object to be recorded by the ELN system, at least one entry is made into the ELN database and the data object, preferably, is transferred from the client computer to the local storage server, wherein the data object may be transformed, e.g. encrypted and/or compressed, in particular before or after the transfer.

The ELN managing application to be hosted by an ELN service provider is configured to be accessible for clients via the internet. The ELN managing application may be installed upon a server or server computer system which is, preferably indirectly, connected by at least one input/output port to the Internet, possibly via a local area network connecting a plurality of computers via any suitable networking protocol, preferably the Ethernet. "Indirectly", in this context, means that such a connection may be secured by a firewall, proxy or reverse proxy servers, or other means for protect the data from an unauthorized access. Preferably, the ELN managing application is configured to communicate with client computers via the Internet via any suitable protocol, preferably HTTPS. This way, the invention may be provided to a user as software as a service (SaaS) which will obviate a user from hardware needs such as a server and necessary server maintenance, security, etc.

Most preferably, the ELN managing application a web application, which is understood to be a client-server software application which the client, or the client software, or a user interface respectively, runs in a web browser. The implementation as a web application follows the concept of SaaS and offers the advantage that updating and maintaining the web applications is possible without distributing and installing proprietary software on all client's computers. Moreover, web applications are cross-platform compatible and are accessible via the pervasive Internet.

The ELN managing application preferably is or comprises a software or a software package. The software is preferably embodied in any suitable programming language or combination of programming languages, including Google Web Toolkit, JAVA, PHP, database managers and MySQL. When setting up the ELN host server, the ".NET" server technology may be used to implement the ELN managing application, which to use many different programming languages simultaneously within the same project. Each software component can be implemented in a high-level procedural or object-oriented programming language, or in assembly or machine language if desired. The programming language may be a compiled or interpreted language.

In order to identify a client or user, respectively, the ELN managing application may be configured, e.g. programmed, to selectively restrict the access of a client to any resource managed by the ELN managing application, in particular the access to data objects in the ELN system or to ELN files. Accessing such resources may include downloading or uploading data to the ELN database, or reading, writing data or data objects to the database, or modifying such data. Modifying the data can include to amend the data of an ELN without downloading the file to a client's computer, but may also be the act of first, downloading original data, second, modifying the original data to become modified data and, third, uploading the modified data to replace the original data. Preferably, ELN managing application is configured to control the permission of a client to access a resource using an authorization process. The access control may implement an authentication process to verify the identity of clients, or users, respectively. When a consumer tries to access a resource, the access control process checks that the consumer has been authorized to use that resource.

The ELN managing application is configured for managing the access of the clients to the electronic laboratory notebook represented by ELN data in an ELN database hosted by the ELN service provider. The ELN managing application may be implemented using digital electronic circuitry, or computer hardware, firmware, software, or combinations of such.

Preferably, the ELN system comprises an ELN host server, which may be a single server or a server cluster. Preferably, the ELN host server runs the ELN managing application and/or stores the ELN database. Preferably, the ELN host server is accessible for the client via the Internet. Preferably, the ELN host server is not located on premises of the client but is located remote thereof.

Preferably, the exchange of messages and/or data between the ELN managing application and the local storage server, and/or between the ELN host server and the local storage server, is—preferably exclusively—taking place via the client computer, in particular via a proxy server of the client computer. A proxy server is understood to be a computer system or an application that acts as an intermediary for requests and messages from the ELN managing application or the ELN host server seeking access to information stored on the local storage server, in case of the present invention. However, the ELN managing application or the ELN host server can, generally, not receive ELN-files from the local storage server or cause an ELN file to be transferred away from the client's premises. These configurations are completely transparent for the client.

The term client is understood here as for describing the client computer, the client software, the user using the client software and/or the company running the client computer for using the ELN system, depending on the context.

The client computer may be any processing device, capable of running the client software and capable to connect to the Internet. Any processing device may be utilized, including for instance, a personal computer, a laptop, a tablet computer or a smart phone.

The client software, preferably, is an Internet browser (web browser) such as Internet Explorer™, Microsoft® Edge, Vivaldi, Mozilla Firefox, Chrome, Safari, capable to browse on the ELN host server via the internet. Moreover, the client software may be embodied in any suitable programming language or combination of programming languages, including Google Web Toolkit, JAVA, PHP, database managers and MySQL. The client software, preferably, is a web application.

The client computer is, preferably, part of a local network, wherein the client computer preferably is connected directly to the Internet, or possibly connected to the Internet via another network computer, which is part of the local network.

The ELN system may comprise a local computer network including at least the client computer and the local storage server. The local computer network, in particular the local computers connected in the computer network, is preferably located on premises of the client. The local computer network may be a local area network (LAN), i.e. a computer network that interconnects computers within a limited area such as a residence, school, laboratory, or office building. Preferably, Ethernet, in particular over cabling and/or Wi-Fi is used for implementing the local area network.

The local storage server, preferably, is located on premises of the client and connected to the client computer. Said connection may be a cable connection or wireless connection. Preferably, said connection is a network connection, e.g. an Ethernet connection. Glass fiber connection or other techniques to enhance the data transfer rate of said connection may be utilized.

The local storage server may be a single server or a server cluster. The operating system of the local storage server, preferably, is Linux based, or any Linux flavour type, or Unix based. Preferably, the operating system supports running a PHP webserver. The local storage server could be a Synology® NAS, for example.

Preferably, the local storage server is disconnected from the Internet, preferably the local storage server is configured to be unable to connect to the Internet, in particular due to a suitable hardware and/or software configuration. This enhances the security feature of the ELN system according to the invention. In particular, transferring the data between the client computer and the local storage server does not utilize an Internet connection.

The local storage server is configured for storing ELN-files, which include content of the ELN, the content being, for example, data objects and/or metadata, which were, in particular, originally provided by the client.

Preferably, the client software is configured to prevent that at least selected, or preferably all, data objects to be represented by the ELN database and to become recorded by the ELN system, can be transferred away from the client computer or the local computer network including the client computer. This is the case for sensitive data objects, also referred to as private data objects.

Preferably, the client software is configured to indicate for the ELN managing application that a data object, which is to be registered into the ELN database, has a private status. This could be achieved by metadata accompanying the data object. Preferably, the ELN managing application is configured to receive from the client software or the client computer the information that a data object, which is to be registered into the ELN database, has a private status.

The following steps are further embodiments of the controlling of the ELN managing application, in dependence on the client's access rights, the transfer of the ELN-files between the local storage server and the client computer. Entering, i.e. recording or uploading, at least one data object into the ELN system is further described. For this purpose, preferably, the ELN managing application is configured to perform, or cause the execution of, at least one, or each, of the following steps, in any suitable order, or in the following order:

marking the at least one data object, which was indicated by the client to be represented by the ELN database, in particular the at least one data object having a private status, with a unique identifier, wherein the at least one data object and preferably also the unique identifier form at least one ELN-file;

storing the unique identifier together with a description, e.g. the filename, of the at least one data object as an entry in the ELN database, transferring the at least one data object, which was indicated by the client to be represented by the ELN database, in particular the at least one data object having a private status, from the client computer to the local storage server causing the at least one data object, which was indicated by the client to be represented by the ELN database, in particular the at least one data object having a private status, to be encrypted, e.g. by the local storage server, the client computer, or another computer inside the local computer network of the client, wherein the at least one encrypted data object and the unique identifier form at least one ELN-file.

The following steps are further embodiments of the controlling of the ELN managing application, in dependence on the client's access rights, the transfer of the ELN-files between the local storage server and the client computer. Entering, i.e. recording or uploading, at least one data object into the ELN system is further described. For this purpose, preferably, the ELN managing application is configured to perform, or cause the execution of, at least one, or each, of the following steps, in any suitable order, or in the following order:

receiving a signal from the client software at the ELN managing application indicating that at least one data object is to be entered into the ELN system, in particular to be uploaded into the ELN system, let the ELN host server, which in particular stores the ELN database, in particular the ELN managing application, generate a unique identifier (ID) and, preferably for the purpose of encryption, a public key, and send this back to the client software, present at the client computer an upload dialog for selecting at least one file, containing the at least one data object, let the client software send the at least one file to the local storage server, along with the ID and the public key, let the local storage server store the at least one file and associate the ID with the at least one file, let the local storage server generate a hash value in dependence on the at least one file, in particular on the content of the at least one file, let the local storage server encrypt the hash value using the public key along with other meta data like file date, modification, encoding, etc.

let the encrypted hash value be transferred from the local storage server back to the client software, let the client software forward the encrypted hash value, in particular as part of a message, to the ELN managing application, and/or in particular to the ELN host server, let the ELN managing application, and/or in particular the ELN host server, decrypt the encrypted hash value using a private key, let the ELN managing application, and/or in particular the ELN host server, store the metadata extracted from the decrypted hash value, along with the ID, in the ELN database.

The transfer of the ELN-files between the local storage server and the client computer is generally controlled by the ELN managing application in dependence on the client's access right. When an upload to the ELN system is requested by a client, the client still needs the permission from the ELN application to actually send the file, even though files are stored locally. This prevents unauthorized access by colleagues that have insufficient privileges to provide additions to the ELN system, but are also connected to the local network. Moreover, the ELN managing application may manage different ELN within the ELN system, each being assigned to a specific user or group within the client's corporation. A client may be authorized to make additions or amendments to his own ELN or the ELN of his group, within the ELN system.

The following steps are further embodiments of the controlling of the ELN managing application, in dependence on the client's access rights, the transfer of the ELN-files between the local storage server and the client computer. Retrieving, i.e. downloading, at least one data object from the ELN system is further described. For this purpose, preferably, the ELN managing application is configured to perform, or cause the execution of, at least one, or each, of the following steps, in any suitable order, or in the following order:

let the ELN managing application receive a query of the client software indicating that the client seeks to download at least one data object, which was previously entered into the ELN system, from the ELN system, let the ELN managing application receive a query of the client software requesting the location, e.g. the path or address, of the at least one data object, which was previously entered into the ELN system, in the ELN system, let the ELN managing application, as a response to said query, lookup the users role and permissions and decide to either decline the request, let the ELN managing application, as a reply to said query, extract the location from the ELN database, where the metadata and the ID were stored before, and send the location and the ID to the client software, let the client software find the local storage server using the location and forward the ID to the local storage server, let the local storage server find the at least one data object using the ID and send the at least one data object directly to the client.

The transfer of the ELN-files between the local storage server and the client computer is generally controlled by the ELN managing application in dependence on the client's access right. When a download from the ELN system is requested by a client, the client still needs the permission from the ELN application to actually receive the file, even though files are stored locally. This prevents unauthorized access by colleagues that have insufficient privileges but are also connected to the local network. Moreover, the ELN managing application of one ELN system may manage different ELN, each being assigned to a specific user or group within the client's corporation. A client may be authorized to make additions or amendments to his own ELN or the ELN of his group, within the ELN system.

The method according to the invention for managing an electronic laboratory notebook (ELN), comprises the steps of providing an ELN managing application, which hosted by an ELN service provider, which is accessible for clients via the Internet and which is configured for managing the access of the clients on the electronic laboratory notebook represented by ELN data in an ELN database hosted by the ELN service provider, receiving, via the Internet and by means of the ELN managing application, a query of a client software, which runs on a client computer being located on premises of the client, wherein the query involves transferring ELN-files, which include content of the ELN, between the client computer and a local storage server, which is located on premises of the client and configured for storing the ELN files, controlling, by means of the ELN managing application and depending on the client's access rights, the transfer of the ELN-files between the client computer and the local storage server.

Preferred embodiments of the method according to the invention may be derived from the description of the ELN system and its preferred embodiments.

The ELN system and the method according to the invention are applicable, for example, in research or industry related to pharmacy, biomedical sciences, biotechnology, in particular plant biotechnology, microbiology, chemistry or nanotechnology.

Further preferred configurations of the ELN system according to the invention and the method according to the invention emerge from the following description of the exemplary embodiments in conjunction with the figures and the description thereof. If nothing else is described or if nothing else emerges from the context, the same components of the exemplary embodiments are substantially characterized by the same reference signs. In detail.

Figure 1:
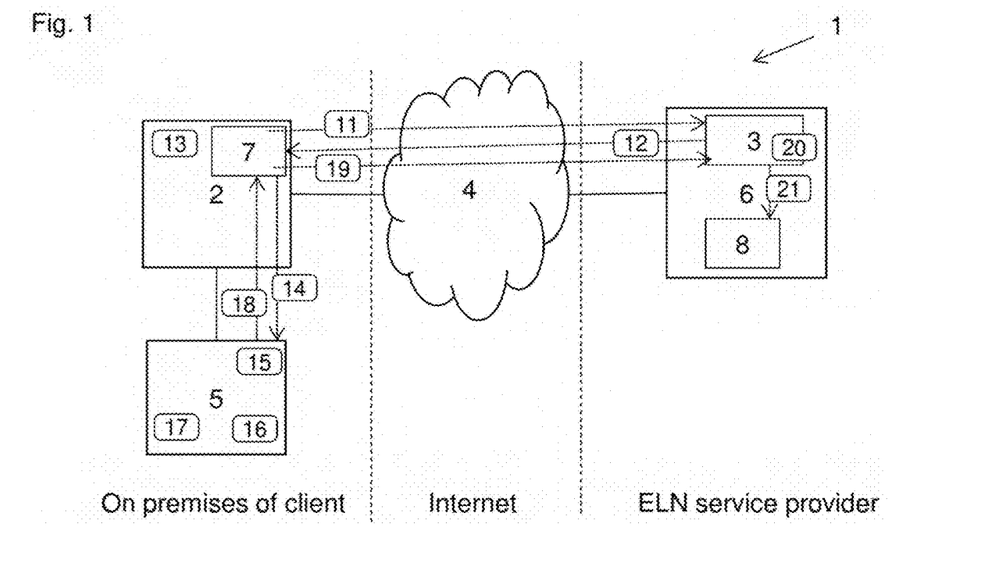
FIG. 1 shows an ELN system according to an embodiment of the present invention, and the steps of the method according to the invention in an embodiment of uploading to the ELN system.

FIG. 1 shows an ELN system 1 according to an embodiment of the present invention, and the steps 11 to 21 of the method according to the invention in an embodiment of uploading to the ELN system. The ELN system and the method according to this embodiment of the invention respectively allows locally stored files, disconnected from the internet, to be used and served by a remotely hosted website on the internet.

In the example, the ELN system 1 allows its ELN managing application, the web application 3, hosted from its own ELN host server, the datacenters 6, to utilize local storage server 5 that are situated on premises of the customer. Key advantages are: (1) The local storage server 5 does not need to be connected to the internet, (2) For the web application 3 user, there is a seamless experience, meaning that the user doesn't need to change its behavior in how the use the application, when switching from ELN files hosted from datacenters 6 or ELN files served from local storage servers 5. (3) The ELN files to be stored on the local storage server 5 are never run through the Internet 4, but are directed straight to the local storage server 5, corresponding to method step 14. Still, the web application 3 is fully aware that the ELN file exists, recording its meta data and a hash to check for integrity.

Usage Example: a user, e.g. a researcher in a biomedical laboratory, who uses the client computer 2 running a client software 7, here a web browser 7, logs into the web application 3 using an https://-address. The user opens an experiment and adds a section Affymetric CEL data files'. The section is inserted into the experiment with a button labeled 'Upload File'. The user presses this button and selects the files from its harddrive. The files are now uploaded into the ELN system 1 and presented as a clickable list with filenames in the section. Clicking on the file will download the file for use. From the submenu, the user can request a certificate issued by the ELN system 1 that proves indisputable that the file 'as is' existed at a specific date & time, including a unique hash-string that proves the integrity and contents of the file at that point in time. The file upload/download process is identical in experience as to when the file would have been uploaded to the cloud-servers itself, but in reality the file-upload/download is redirected to a local storage server.

If the users requests a file to be uploaded and presses the upload button, the ELN managing application is configured to apply the method according to the invention: the web application 3 accessed and executed by a web browser 7 of the client 2 will send a signal toward the cloud-servers 6 that a file is being prepared for upload (11). The cloud-servers 6, or the web application 3, respectively, generate a unique ID and a public key, and sends this back to the client software 7 (12). The user will then be presented with an upload dialog for selecting a file (13). The file will be send to the local storage server 5, here a local NAS 5, by the client 7, along with the unique ID and public key (14). The NAS 5 will now store the files and associate the unique ID with that file (15). It will generate a hash based on the contents (16) and encrypt this hash using the public key along with other meta data like file date, modification, encoding etc (17). The resulted encrypted string is send back to the client 7 (18), which in turn will forward that message to the cloud-servers 6 (19). The cloud-servers will decrypt the contents using a private key (20) and store the meta-data in its database with the ID (21).

When generating the message including the hash key and the metadata, the following steps are performed: a package is prepared with the following contents: (1) A hash, e.g. SHA-2, is generated from the file contents, resulting, e.g., in a string of 64 characters that represents the contents, even if these contents is a file of many GB's. (2) Meta data is recorded, such as file length, timestamps of creation and modification, filename etc. The hash and metadata are then packaged as a data package, in particular a file, which gets encrypted with the public key. The encrypted package is send to the ELN managing application which will use its private key to decrypt the contents. It will now have the hash and metadata on record. During application of the ELN, assuming that client needs to prove that a certain file existed at a certain point in time with exactly the contents as presented, the following steps may apply: The client, or the party that needs proof, will ask the ELN managing application for the hash and meta data, which include the time stamps. The client or any other third party may perform the same SHA-2 hashing on the questioned file using any readable available software that can do hashing. The resulting hash should be identical to the one registered in the ELN. If not, the file has been tampered with. If it is the same hash, the client or party will then have proof that the file existed for at least since the time that the ELN recorded the hash.

Figure 2:
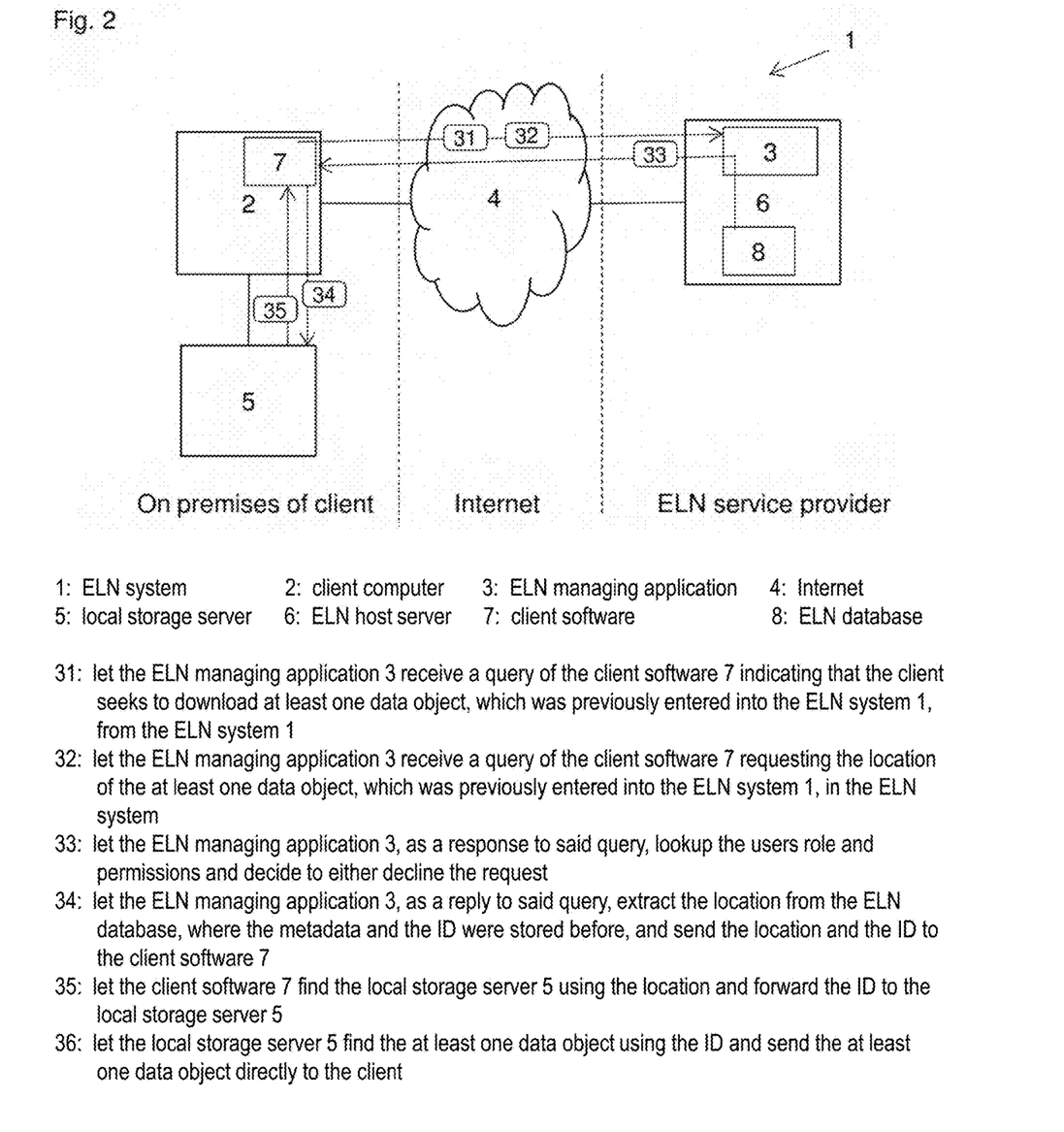
FIG. 2 shows an ELN system according to an embodiment of the present invention, and the steps of the method according to the invention in an embodiment of downloading from the ELN system.

FIG. 2 shows the ELN system 1 according to an embodiment of the present invention, and the steps 31 to 35 of the method according to the invention in an embodiment of downloading from the ELN system.

If the users request the file to be downloaded for use (31), the ELN managing application will apply an authorization process to verify that a user has the permission to access the ELN data. In case that the access is granted, the ELN managing application will inform the client software 7, where the file resides and/or the client software 7 will ask the cloud-servers 6 where the files resides (32). The cloud-server will reply with the local NAS server address and the unique ID (33). The client 7 will now find the NAS and forward the unique ID to the before mentioned local NAS server address (34), which will find and transfer the file directly to the client (35).

The invention claimed is:

1. Electronic laboratory notebook (ELN) system for use in research or industry related to pharmacy, medical centers, biomedical laboratories, biotechnology, plant biotechnology, microbiology, chemistry or nanotechnology, comprising an ELN managing application getting hosted by an ELN service provider, the ELN managing application being accessible for clients via the Internet and being configured for managing the access of the clients on the electronic laboratory note-book represented by ELN data in an ELN database hosted by the ELN service provider, an ELN host server and the ELN database stored on the ELN host server, the ELN data in the ELN database containing data entries, which contain the references to ELN files, the ELN files being stored separately from the ELN database and being stored on a local storage server, a client computer being located on premises of the client and connected to the internet, the client computer running a client software to communicate with the ELN managing application via the Internet, the local storage server being located on premises of the client and connected to the client computer, the local storage server being configured for storing the ELN-files, which include content of the ELN and which are referenced by the data entries of the ELN database, and the ELN managing application being configured for controlling, in dependence on the client's access rights, the transfer of the ELN-files between the local storage server and the client computer.

2. The ELN system of claim 1, wherein the ELN managing application is configured for controlling the upload of ELN-files from the client computer to the local storage server by implementing, or causing the execution of, at least the following steps:

receiving a signal from the client software at the ELN managing application indicating that at least one data object is being entered into the ELN system, in particular being uploaded into the ELN system, let the ELN host server, which in particular stores the ELN database, in particular the ELN managing application, generate a unique identifier (ID) and, preferably for the purpose of encryption, a public key, and send this back to the client software, present at the client computer an upload dialog for selecting at least one file, containing the at least one data object, let the client software send the at least one file to the local storage server, along with the ID and the public key.

3. The ELN system of claim 2, wherein the ELN managing application is configured for controlling the upload of ELN-files from the client computer to the local storage server by implementing, or causing the execution of, at least the following steps:

let the local storage server store the at least one file and associate the ID with the at least one file, let the local storage server generate a hash value in dependence on the at least one file, in particular on the content of the at least one file, let the local storage server encrypt a message containing the hash value along with other meta data like file date, modification, encoding, etc, using the public key, let the encrypted hash value be transferred from the local storage server back to the client software.

4. The ELN system of claim 3, wherein the ELN managing application is configured for controlling the upload of ELN-files from the client computer to the local storage server by implementing, or causing the execution of, at least the following step:

let the client software forward the encrypted message containing at least the hash value and the metadata to the ELN managing application, and/or in particular to the ELN host server.

5. The ELN system of claim 4, wherein the ELN managing application is configured for controlling the upload of ELN-files from the client computer to the local storage server by implementing, or causing the execution of, at least the following steps:

let the ELN managing application, and/or in particular the ELN host server, decrypt the message containing at least the encrypted hash value and the metadata, using a private key, let the ELN managing application, and/or in particular the ELN host server, store the metadata extracted from the decrypted message that includes at least the hash value and the metadata, along with the ID, in the ELN database.

6. The ELN system of claim 1, wherein the ELN managing application is configured for controlling the download of ELN-files from the local storage server as requested by the client computer, by implementing, or causing the execution of, at least the following steps:

let the ELN managing application receive a query of the client software indicating that the client seeks to download at least one data object, which was previously entered into the ELN system, from the ELN system, let the ELN managing application receive a query of the client software requesting the location, e.g. the path or address, of the at least one data object, which was previously entered into the ELN system, in the ELN system, let the ELN managing application, as a response to said query, lookup the users role and permissions and decide to either decline the request, let the ELN managing application, as a reply to said query, extract the location from the ELN database, where the metadata and the ID were stored before, and send the location and the ID to the client software, let the client software find the local storage server using the location and forward the ID to the local storage server, let the local storage server find the at least one data object using the ID and send the at least one data object directly to the client.

7. Method for managing an electronic laboratory notebook (ELN) system for use in research or industry related to pharmacy, medical centers, biomedical laboratories, biotechnology, plant biotechnology, microbiology, chemistry or nanotechnology, comprising the steps of providing an ELN managing application, which is hosted by an ELN service provider, which is accessible for clients via the Internet and which is configured for managing the access of the clients on the electronic laboratory notebook represented by ELN data in an ELN database stored on an ELN host server and hosted by the ELN service provider, the ELN data in the ELN database containing data entries, which contain the references to ELN files, the ELN files being stored separately from the ELN database and being stored on a local storage server, receiving, via the Internet and by means of the ELN managing application, a query of a client software, which runs on a client computer being located on premises of the client, wherein the query involves transferring ELN-files, which include content of the ELN and which are referenced by the data entries of the ELN database, between the client computer and the local storage server, which is located on premises of the client and configured for storing the ELN files, controlling, by means of the ELN managing application and depending on the client's access rights, the transfer of the ELN-files between the client computer and the local storage server.

8. The Method according to claim 7, wherein the step of the controlling of the transfer of the ELN-files between the local storage server and the client computer comprises, for the purpose of uploading a ELN file from the ELN system, the following steps:

receiving a signal from the client software at the ELN managing application indicating that at least one data object is being entered into the ELN system, in particular being uploaded into the ELN system, let the ELN host server, which in particular stores the ELN database, in particular the ELN managing application, generate a unique identifier (ID) and, preferably for the purpose of encryption, a public key, and send this back to the client software, present at the client computer an upload dialog for selecting at least one file, containing the at least one data object, let the client software send the at least one file to the local storage server, along with the ID and the public key.

9. The Method according to claim 8, wherein the step of the controlling of the transfer of the ELN-files between the local storage server and the client computer additionally comprises, for the purpose of uploading a ELN file from the ELN system, the following steps:

let the local storage server store the at least one file and associate the ID with the at least one file, let the local storage server generate a hash value in dependence on the at least one file, in particular on the content of the at least one file, let the local storage server encrypt a message including the hash value along with other meta data like file date, modification, encoding, etc., using the public key, let the encrypted message including at least the hash value and the metadata be transferred from the local storage server back to the client software.

10. The Method according to claim 9, wherein the step of the controlling of the transfer of the ELN-files between the local storage server and the client computer additionally comprises, for the purpose of uploading a ELN file from the ELN system, the following step:

let the client software forward the message containing at least the encrypted hash value and the metadata to the ELN managing application, and/or in particular to the ELN host server.

11. The Method according to claim 10, wherein the step of the controlling of the transfer of the ELN-files between the local storage server and the client computer additionally comprises, for the purpose of uploading a ELN file from the ELN system, the following steps:

let the ELN managing application, and/or in particular the ELN host server, decrypt the message containing at least the encrypted hash and the metadata value using a private key, let the ELN managing application, and/or in particular the ELN host server, store the metadata extracted from the decrypted message containing at least the hash value and the metadata, along with the ID, in the ELN database.

12. The Method according to claim 7, wherein the step of the controlling of the transfer of the ELN-files between the local storage server and the client computer additionally comprises, for the purpose of downloading a ELN file from the ELN system, the following steps:

let the ELN managing application receive a query of the client software indicating that the client seeks to download at least one data object, which was previously entered into the ELN system, from the ELN system, let the ELN managing application receive a query of the client software requesting the location, e.g. the path or address, of the at least one data object, which was previously entered into the ELN system, in the ELN system, let the ELN managing application, as a response to said query, lookup the users role and permissions and decide to either decline the request, let the ELN managing application, as a reply to said query, extract the location from the ELN database, where the metadata and the ID were stored before, and send the location and the ID to the client software, let the client software find the local storage server using the location and forward the ID to the local storage server, let the local storage server find the at least one data object using the ID and send the at least one data object directly to the client.

13. A non-transitory data storage medium containing data representing an executable program code for running and ELN managing application, which can be hosted by an ELN service provider, which is accessible for clients via the Internet and which is configured for managing the access of the clients on the electronic laboratory notebook represented by ELN data in an ELN database stored on an ELN host server and hosted by the ELN service provider, the ELN data in the ELN database containing data entries, which contain the references to ELN files, the ELN files being stored separately from the ELN database and being stored on a local storage server, the content of the ELN files being usable for research or industry related to pharmacy, medical centers, biomedical laboratories, biotechnology, plant biotechnology, microbiology, chemistry or nanotechnology, the executable program code realizing the following functions:

receiving, via the Internet and by means of the ELN managing application, a query of a client software, which runs on a client computer being located on premises of the client, wherein the query involves transferring ELN-files, which include content of the ELN and which are referenced by the data entries of the ELN database, between the client computer and the local storage server, which is located on premises of the client and configured for storing the ELN files, controlling, by means of the ELN managing application and depending on the client's access rights, the transfer of the ELN-files between the client computer and the local storage server.

* * * * *